(12) United States Patent  
Hösle

(10) Patent No.: US 6,420,808 B1  
(45) Date of Patent: Jul. 16, 2002

(54) GEARING FOR WIND GENERATORS

(75) Inventor: Helmut Hösle, Diedorf (DE)

(73) Assignee: Renk Aktiengesellschaft, Augsburg (DE)

( * ) Notice: Subject to any disclaimer, the term of this patent is extended or adjusted under 35 U.S.C. 154(b) by 0 days.

(21) Appl. No.: 09/552,113

(22) Filed: Apr. 19, 2000

(30) Foreign Application Priority Data

Apr. 19, 1999 (DE) .......................................... 199 17 605

(51) Int. Cl.$^7$ ............................. H02K 7/10; F03D 7/04; F16H 47/04

(52) U.S. Cl. ............................. 310/83; 290/55; 290/44; 475/331; 475/346; 475/249

(58) Field of Search ................................. 310/75 R, 80, 310/83, 92, 96, 99; 90/1 C, 54, 55, 43, 44; 475/331, 346, 231, 236, 248, 249

(56) References Cited

U.S. PATENT DOCUMENTS

| | | | |
|---|---|---|---|
| 2,913,064 A | | 11/1959 | Ferguson et al. ............. 180/53 |
| 4,239,977 A | * | 12/1980 | Strutman ..................... 290/44 |
| 4,329,117 A | * | 5/1982 | Doman .................... 416/170 R |
| 4,656,890 A | * | 4/1987 | Marquardt ................... 74/801 |
| 4,757,211 A | | 7/1988 | Kristensen ................... 290/55 |
| 4,871,923 A | | 10/1989 | Scholz et al. ................. 290/55 |
| 5,105,670 A | * | 4/1992 | Isozumi et al. ................. 74/6 |
| 5,117,736 A | * | 6/1992 | Mader ....................... 89/33.25 |
| 5,140,170 A | * | 8/1992 | Henderson ................... 290/44 |
| 5,222,924 A | * | 6/1993 | Shin et al. .................. 475/329 |
| 5,458,014 A | * | 10/1995 | Thomas et al. ............... 74/325 |
| 5,663,600 A | | 9/1997 | Back et al .................... 290/55 |
| 5,679,089 A | * | 10/1997 | Levedahl .................... 475/332 |
| 5,787,766 A | * | 8/1998 | Blach ....................... 74/665 G |
| 5,876,181 A | * | 3/1999 | Shin ......................... 415/2.1 |

FOREIGN PATENT DOCUMENTS

| | | |
|---|---|---|
| DE | 1 104 458 | 4/1961 |
| DE | 1 145 460 | 3/1963 |
| DE | 1 179 058 | 10/1964 |
| DE | 1 198 206 | 8/1965 |
| DE | 2 165 286 | 7/1973 |
| EP | 0 728 963 A1 | 8/1996 |
| FR | 1 240 081 | 7/1960 |
| FR | 1 601 670 | 10/1970 |
| GB | 935 657 | 11/1955 |
| WO | WO 91/19916 | 12/1991 |

OTHER PUBLICATIONS

Article entitled "Gears for wind Power Plants" by P. Thöblad published in Wind Energy Systems dated Oct. 3–6, 1978, Paper C6, pp.c6–89–6–106.

Article entitled :Kompakte Industriegetriebe REDULUS GP published in Lohmann + Stolterfoht, 1980, 11 pages.

Article entitled "Schwenkgetriebe MOBILEX GFB", published in Lohmann + Stotlerfoht 1974, pp. 1–8.

Article entitled "Mechanische Konstruktionselemente—8 Zahnradgetriebe" written by Wolfgang Beitz, et al., 1990, published in Dubbel, Taschenbuch für den Maschinenbau, 2 pages.

* cited by examiner

Primary Examiner—Nestor Ramirez  
Assistant Examiner—Dang Dinh Le  
(74) Attorney, Agent, or Firm—Cohen, Pontani, Lieberman & Payane

(57) ABSTRACT

A compact drive which has a high transmission ratio for driving generators by wind force and permits simple assembly and maintenance. The gearing is a slip-on gearing having a multi-stage epicyclic gearing arrangement and a spur-gear stage for the drive output to a generator. The force is introduced into the epicyclic gearing arrangement via a ring gear, which drives planet gears, on whose shafts fixed to the housing in each case further planet gears are arranged. The planet gears mesh with a sun gear, from which the drive output to the spur-gear stage is effected.

19 Claims, 1 Drawing Sheet

GEARING FOR WIND GENERATORS

BACKGROUND OF THE INVENTION

1. Field of the Invention

The invention relates to gearing for driving generators by rotors of wind installations, which gearing is designed as slip-on gearing.

2. Background of the Invention

The invention is based on slip-on a gearing which is connected by a press fit to the rotor shaft of a wind installation, with which the wind force is directed into the gearing. In this known embodiment, the hub of the press fit is connected to a planet carrier or a part of the planet carrier and is guided in the gear housing by bearings. The planet gears of the revolving planet carrier roll on a ring gear fixed to the housing and at the same time mesh with a sun gear, by means of which the power is increased. From the sun-gear shaft of this first stage, the power is transmitted into the planet carrier of a second epicyclic stage. This revolving planet carrier guides the planet gears arranged on it in a further ring gear fixed to the housing, and the planet gears drive a sun gear. From there, the power is passed by the pinion shaft of single-stage spur gearing into a generator by means of the gearing.

These gearing arrangements are of complex construction, have large overall lengths and are expensive to assemble and maintain.

SUMMARY OF THE INVENTION

Against this background, the object of the invention is to present a more compact drive which has a high transmission ratio and permits simple assembly and maintenance.

This object is achieved according to the invention by introducing force into an epicyclic gearing arrangement via a ring gear, which drives at least one planet gear, on whose shaft, fixed to housing, is a planet gear. This planet gear meshes with a sun gear from which drive output to a spur-gear stage is effected.

A favorable direct flow of force occurs due to the advantageous bearing arrangement according to the invention.

The load-carrying capacities of the ring-gear teeth and those of the sun gear are optimally utilized due to the torque division according to the invention.

The invention permits simple assembly of the entire arrangement and monitoring of the easily accessible bearings of the planet gears.

The arrangement according to the invention of the sun-gear shaft also permits the extraction of the sun gear.

In gearing according to the invention, only small masses revolve around the central axis, as a result of which better efficiency and simple monitoring is made possible.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference numerals denote similar elements.

DETAILED DESCRIPTION OF THE PREFERRED EMBODIMENTS

Figure 1:
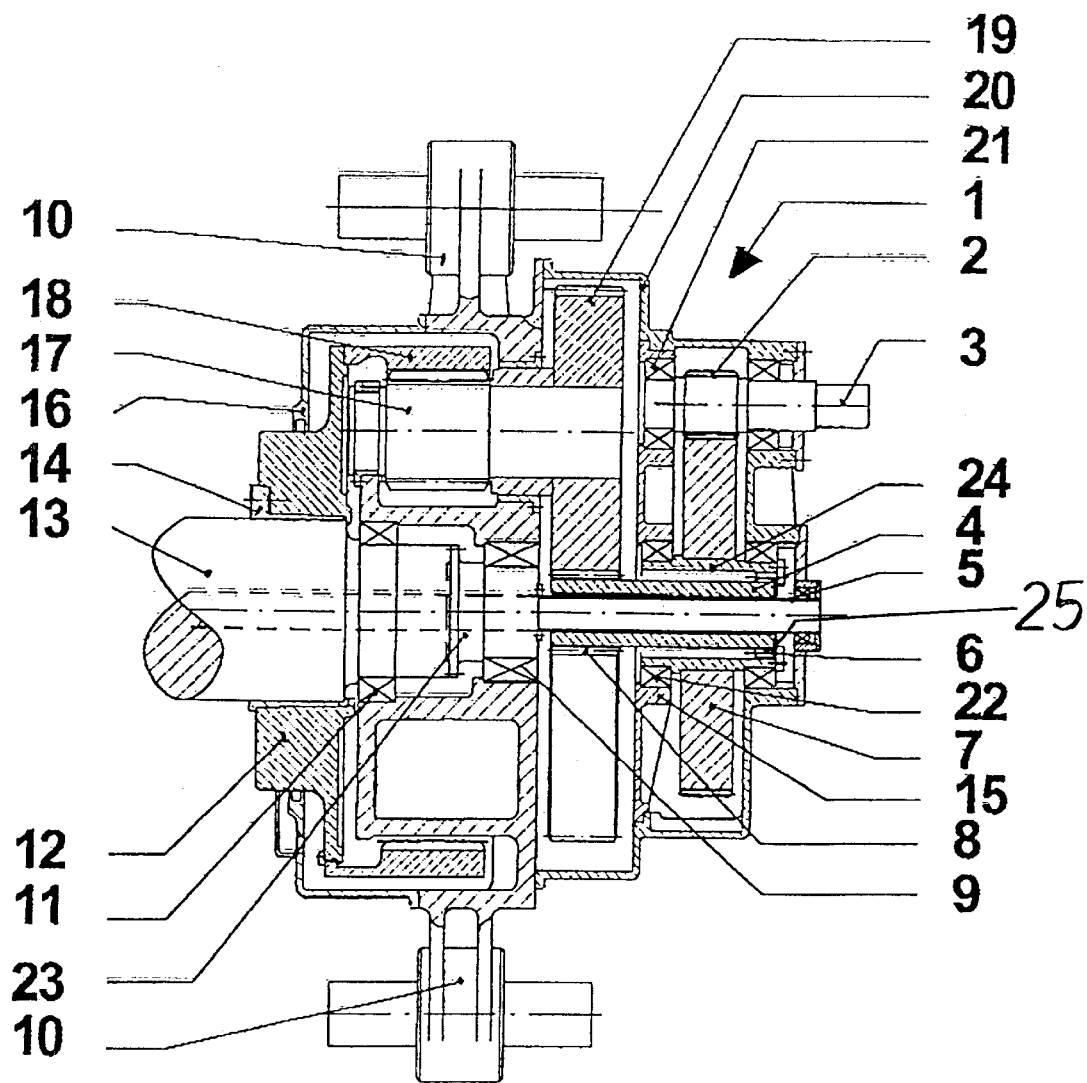
FIG. 1 shows a longitudinal section through a gearing arrangement according to the invention.

The invention is now explained in more detail with reference to FIG. 1. The rotor shaft 13 is shown as a truncated illustration and carries a wind wheel or wind vane or the like at its end which is not shown. This shaft end is fastened to the tower of the installation by a bearing. At its gearing-side end, the rotor shaft 13 is mounted in the housing 16 at an extension 23, which lengthens the rotor shaft 13. The extension 23 may be flange-mounted as a separate component, may be turned as a step on the rotor shaft 13, or may also be built onto the shaft end as a complete construction unit consisting of the ring-gear carrier 12 and the extension 23, in which case this construction unit itself may also be in one piece. The rotor shaft 13 is bored out for accommodating control devices for influencing the wind vane. The extension 23 therefore also has a passage, which is directed with a tube 5 through the flange housing 20 and permits the fitting of further control devices on that side of the housing 20 which is remote from the wind wheel.

The ring-gear carrier 12 is arranged on the driving end of the rotor shaft 13, that is in the region close to the end but in front of the extension 23. This connection to the rotor shaft 13 is made as a shrink fit by means of a shrink disc 14. Further embodiments provide for a press fit or a form fit by a splined-shaft connection. However, other shaft/hub connections are also possible. The ring-gear carrier 12 accommodates the ring gear 18, which drives the force from the rotor shaft 13 into one or more planet gears 17. A further planet gear 19 which meshes with the sun gear 8 is in each case arranged in an axially offset manner on the shafts, rotatably mounted in the housing 16, of the planet gears 17. From the sun gear 8, which is centered in a floating position between a plurality of planet gears, the force is directed via the bored-out sun-gear shaft 4 by a coupling 6, preferably a toothed coupling, to a hub 24, in the interior of which the sun-gear shaft 4 is accommodated.

Without additional outlay in terms of design, the epicyclic gearing stages 18, 17, 19, 8 can be made with helical tooth systems, in which case the axial forces of the planet gears 17, 19 are compensated and the advantages of helical tooth systems, such as smoother running properties or higher load-carrying capacity, can be utilized.

Drive fluctuations, which are due to irregular wind conditions or other effects, are alleviated or compensated for by an elastic axial fastening of the sun-gear shaft.

Furthermore, it is possible to obtain information about the current operating data of the installation, such as torque, power output, etc., by measuring the axial forces which occur. If these data are known, appropriately controlled intervention in the operating sequence may then be carried out, e.g. shutdown in the event of overload and the risk of destruction of the gearing. To this end, a sensor 25 is preferably attached to the hub 24, which is mounted in an axially fixed position. The sensor 25 records the force with which the sun-gear shaft 4, fastened to the hub 24 in an axially elastic manner, presses on the hub 24. A suitable sensor 25 for this purpose is, for example, a load cell (based on piezoelectric, inductive or similar principles) or a displacement transducer which records the relative movements between the sun-gear shaft 4 and the hub 24 and indirectly, via the spring constant of the elastic connecting member, provides information about the force which occurs.

The hub 24 carries a spur gear 7, which meshes with a pinion 2, which is preferably milled directly onto the output shaft 3. The drive power is directed into the generator from the output shaft 3.

The gearing-side end of the rotor shaft 13 is mounted with a bearing 9 which is supported in the planet carrier 12, which forms a unit with the housing 16. The bearing 9 is virtually in alignment with the torque supports 10, which absorb the reaction moment of the housing 16 and direct it into the tower of the installation. All the forces or moments which occur are therefore passed into the one-piece housing 16 by direct transmission of force and there are no complicated joints via which the force has to be directed. The tilting moment of the gearing is supported with respect to the rotor shaft 13 via a bearing 11. In the embodiment shown, the bearing 11 is arranged inside the planet carrier; in further design variants, however, this bearing may be shifted to the passage opening for the ring-gear carrier 12 through the wall of the housing 16. In these exemplary embodiments, the housing 16 is then indirectly supported on the rotor shaft 13 via the ring-gear carrier 12.

The ring gear 18 may be connected to the ring-gear carrier 12 both with a combination of frictional and positive-locking elements and purely by positive locking. To this end, screwed connections are produced, which are reinforced with straight pins, or an axially secured toothed coupling is used.

The planet-gear shafts are mounted on both sides of the first planet gear 17 in the planet carrier, which forms an integral unit with the housing 16. In each case a second planet gear 19 is attached to the free shaft end projecting into the flange housing 20.

The flange housing 20 is flange-mounted on the housing 16 and encloses the second epicyclic gearing stage 19, 8 on its open side. On its closed side, the flange housing 20 accommodates the spur-gear stage 7, 2. The hub 24 is mounted on both sides of the spur gear 7, on the one hand in the outer wall of the flange housing 20, and on the other hand in a bearing 22 which is introduced into the seated bearing cap 15, which also carries the bearing 21, directed towards the epicyclic stage 19, 8, of the output shaft 3. The output shaft 3 is supported in a further bearing in the outer wall of the flange housing 20. Through the use of the bearing cap 15, a horizontal division, which would entail a sealing problem, at the flange housing 20 can be dispensed with.

Depending on the embodiment, the slip-on gearing 1 can either be fitted to the rotor shaft 13 as a completely preassembled unit or can be assembled in stages.

For maintenance purposes, after a housing lid on the closed side of the flange housing 20 has been removed, the sun gear 8 together with the sun-gear shaft 4 can be removed from the gearing.

Furthermore, it is possible to monitor the function of the easily accessible bearings of the non-revolving planet-gear shafts, for example, via structure-borne-noise measurements.

The advantageous introduction of force via the ring gear 18 into the first epicyclic gearing stage 18, 17, which does not need a sun gear, which limits the loading capacity, results in favorable preconditions for the design, so that the construction can be very compact. The loading limit, which is thus shifted outwards, and the consequently optimum utilization of the material characteristics can be further increased by case hardening the teeth of the ring gear. With the power transmission remaining the same and with the same transmission ratio, it is possible by means of this especially advantageous measure to design the tooth width to be narrower or to reduce the diameter of the ring gear 18. As a result, the overall volume and the weight of the gearing can be further reduced or, with the same dimensions of the components, a greater power output can be transmitted with the same gearing.

To increase the limit of the loading capacity of the ring-gear teeth, other surface-hardening processes, such as, for example, induction hardening, flame hardening or combined processes such as carbonitriding or nitrocarburizing, may also be used.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A gearing for slipping onto a rotor shaft, comprising: a housing; a multi-stage epicyclic gearing arrangement; and a spur-gear stage for drive output to a generator, the epicyclic gearing arrangement including a sun gear, a planet gear, a ring gear which drives the planet gear, the ring gear having case hardened teeth, the planet gear having a shaft rotatably mounted in the housing, and a further planet gear arranged on the shaft, the further planet gear meshing with the sun gear, from which the drive output to the spur-gear stage is effected.

2. A gearing for slipping onto a rotor shaft according to claim 1, and further comprising a first bearing that supports an end of the rotor shaft close to the gearing, and a second bearing arranged so as to support a tilting moment, resulting from gearing forces, of the slip-on gearing with respect to the rotor shaft.

3. A gearing for slipping onto a rotor shaft according to claim 1, and further comprising a ring-gear carrier having a hub to which the rotor shaft is connected, the ring gear being connected to the ring gear carrier, and an extension, which is opposite the hub, lengthens the rotor shaft and projects into the housing so as to support the rotor shaft in the housing by a bearing.

4. A gearing for slipping onto a rotor shaft according to claim 3, wherein the ring-gear carrier is a single piece.

5. A gearing for slipping onto a rotor shaft according to claim 3, wherein the ring-gear carrier is composed of a plurality of parts.

6. A gearing for slipping onto a rotor shaft according to claim 3, wherein the rotor shaft and the ring-gear carrier are frictionally connected.

7. A gearing for slipping onto a rotor shaft according to claim 6, wherein the rotor shaft and the ring-gear carrier arc connected together by a press fit.

8. A gearing for slipping onto a rotor shaft according to claim 6, wherein the rotor shaft and the ring-gear carrier are connected together by a shrink fit.

9. A gearing for slipping onto a rotor shaft according to claim 3, wherein the rotor shaft and the ring-gear carrier are connected in a positive-locking manner.

10. A gearing for slipping onto a rotor shaft according to claim 9, wherein the connection between the rotor shaft and the ring-gear carrier is a splined-shaft connection.

11. A gearing for slipping onto a rotor shaft according to claim 3, wherein the ring gear and the ring-gear carrier are connected in a frictional and positive-locking manner.

12. A gearing for slipping onto a rotor shaft according to claim 11, wherein the connection is by screws and pins.

13. A gearing for slipping onto a rotor shaft according to claim 3, wherein the ring gear and the ring-gear carrier are connected in a positive-locking manner.

14. A gearing for slipping onto a rotor shaft according to claim 13, wherein the connection is produced by a toothed coupling.

15. A gearing for slipping onto a rotor shaft according to claim 1, wherein the spur-gear stage includes bearings which are arranged on a side directed towards the epicyclic gearing stage, and further comprising a flange housing and a bearing cap fastened in a gearing interior of the flange housing, the bearings of the spur-gear stage being accommodated in the bearing cap.

16. A gearing for slipping onto a rotor shaft according to claim 1, wherein the epicyclic gearing stages have helical tooth systems.

17. A gearing for slipping onto a rotor shaft according to claim 1, wherein the sun gear is attached so as to be movable in an axial direction.

18. A gearing for slipping onto a rotor shaft according to claim 17, wherein the sun gear has a shaft, and further comprising sensor means for recording axial force of the sun-gear shaft.

19. A gearing for slipping onto a rotor shaft according to claim 1, wherein the sun gear has a shaft, and further comprising sensor means for recording axial force of the sun-gear shaft.

* * * * *